US007705776B2

(12) United States Patent  
Qi et al.

(10) Patent No.: US 7,705,776 B2  
(45) Date of Patent: *Apr. 27, 2010

(54) MOBILE WIRELESS COMMUNICATIONS DEVICE COMPRISING A SATELLITE POSITIONING SYSTEM ANTENNA AND ELECTRICALLY CONDUCTIVE DIRECTOR ELEMENT THEREFOR

(75) Inventors: Yihong Qi, Waterloo (CA); Ying Tong Man, Kitchener (CA); Perry Jarmuszewski, Waterloo (CA); Adrian Cooke, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/753,424

(22) Filed: May 24, 2007

(65) Prior Publication Data

US 2007/0222690 A1 Sep. 27, 2007

Related U.S. Application Data

(63) Continuation of application No. 11/140,826, filed on May 31, 2005, now Pat. No. 7,239,270.

(51) Int. Cl.
*G01S 1/02* (2006.01)
*H01Q 19/10* (2006.01)

(52) U.S. Cl. .................................. 342/357.1; 343/818

(58) Field of Classification Search .............. 342/354, 342/357.06, 357.1, 357.12, 419; 701/213, 701/215; 343/818; 455/556.1

See application file for complete search history.

(56) References Cited

U.S. PATENT DOCUMENTS

| 5,515,057 | A | 5/1996 | Lennen et al. ............... 342/357 |
|---|---|---|---|
| 6,046,703 | A | 4/2000 | Wang et al. .................. 343/795 |
| 6,075,484 | A | 6/2000 | Daniel et al. ................. 342/372 |
| 6,492,952 | B1 | 12/2002 | Hu .............................. 343/702 |
| 6,512,481 | B1 | 1/2003 | Velazquez et al. ............ 342/367 |
| 6,639,560 | B1 | 10/2003 | Kadambi et al. ...... 343/700 MS |
| 6,720,923 | B1 | 4/2004 | Hayward et al. ...... 343/700 MS |
| 6,857,016 | B1 | 2/2005 | Motoyama et al. .......... 709/224 |
| 7,239,270 | B2* | 7/2007 | Qi et al. ................... 342/357.1 |
| 2001/0003443 | A1 | 6/2001 | Velazquez et al. ........... 342/367 |
| 2003/0190896 | A1 | 10/2003 | Ota et al. .................... 455/90.3 |
| 2004/0032370 | A1 | 2/2004 | Ito et al. ...................... 343/702 |
| 2004/0063476 | A1 | 4/2004 | Katagishi et al. ............ 455/273 |
| 2006/0094449 | A1 | 5/2006 | Goldberg ................. 455/456.6 |

FOREIGN PATENT DOCUMENTS

| CA | 2414124 | 6/2004 |
|---|---|---|
| CN | 11556630 | 7/1997 |

(Continued)

*Primary Examiner*—Dao L Phan  
(74) *Attorney, Agent, or Firm*—Allen, Dyer, Doppelt, Milbrath & Gilchrist, P.A.

(57) ABSTRACT

A mobile wireless communications device may include a portable housing, at least one wireless transceiver carried by the portable housing, and a satellite positioning signal receiver carried by the portable housing. An antenna may also be carried by the portable housing and connected to the satellite positioning signal receiver. Further, at least one electrically conductive director element may be carried by the portable housing in spaced apart relation from the antenna and inductively coupled thereto for directing a beam pattern thereof.

16 Claims, 6 Drawing Sheets

FOREIGN PATENT DOCUMENTS

| | | |
|---|---|---|
| CN | 1391710 | 1/2003 |
| EP | 1487051 | 12/2004 |
| WO | 97/41619 | 11/1997 |
| WO | 01/26181 | 4/2001 |
| WO | 02/29988 | 4/2002 |

* cited by examiner

MOBILE WIRELESS COMMUNICATIONS DEVICE COMPRISING A SATELLITE POSITIONING SYSTEM ANTENNA AND ELECTRICALLY CONDUCTIVE DIRECTOR ELEMENT THEREFOR

CROSS-REFERENCE TO RELATED APPLICATION

This application is a continuation of application Ser. No. 11/140,826 filed May 31, 2005 now U.S. Pat. No. 7,239,270, the entire disclosure of which is hereby incorporated herein by reference.

FIELD OF THE INVENTION

The present invention relates to the field of communications devices, and, more particularly, to mobile wireless communications devices and related methods.

BACKGROUND OF THE INVENTION

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Another feature which is being coupled with cellular communications capabilities is satellite positioning. That is, certain devices now incorporate both cellular and satellite positioning devices, such as global positioning system (GPS) devices, for example. One such device is described in U.S. Pat. No. 6,857,016 to Motoyama et al., which is directed to a computer remote position reporting device which includes a global positioning system (GPS) receiver, monitoring software and an Internet access module for tracking and mapping a position of a mobile object. In one embodiment, the obtained positions are collected, logged and communicated to a desired location by a store-and-forward protocol (e.g., Internet e-mail) or a direct-connection protocol (e.g., file transfer protocol (FTP)) via a wireless cellular transceiver.

As the functionality of cellular communications devices continues to increase, so too does the demand for smaller devices which are easier and more convenient for users to carry. As such, incorporating GPS capabilities in ever-smaller cellular phones becomes increasingly difficult, as smaller GPS antenna designs are required due to space constraints. Thus, one challenge for designers is to provide GPS antennas with adequate signal reception characteristics yet in a relatively small size.

Various attempts have been made improve mobile device satellite positioning antennas. An antenna arrangement for a GPS signal processing device is disclosed in U.S. Pat. No. 6,720,923 to Hayward et al. in which an antenna member is mounted on a circuit board. The antenna member includes first, second, and third surfaces. The third surface adjoins the first and second surfaces. The first, second and third surfaces define a cavity within which is disposed dielectric material. At least one conductive connector comprising first and second ends is in communication with the antenna member first surface, and an amplifier is in communication with each conductive connector second end.

Another example is set forth in PCT publication no. WO 02/29988 A1, which discloses a folded inverted F antenna (FIFA) which includes an L-shaped receiving element having a first planar portion and a second planar portion connected along a fold edge. A printed circuit board (PCB) is disposed perpendicular to the second planar portion forming a PCB ground plane. The FIFA includes a second ground plane disposed below and in parallel with the second planar portion. Shorting conductors couple the receiving element to the PCB and the second ground plane, and a receive conductor couples a receiver circuit to the receiving element. The FIFA is for use in a wireless communications device, such as a cellular phone, for receiving position signals from a GPS satellite.

Despite the availability of such GPS antenna configurations, other GPS antenna configurations may be desirable which are relatively compact yet still provide desired beam direction or shaping for optimizing GPS satellite signal reception, for example.

DETAILED DESCRIPTION OF THE PREFERRED EMBODIMENTS

Figure 1:
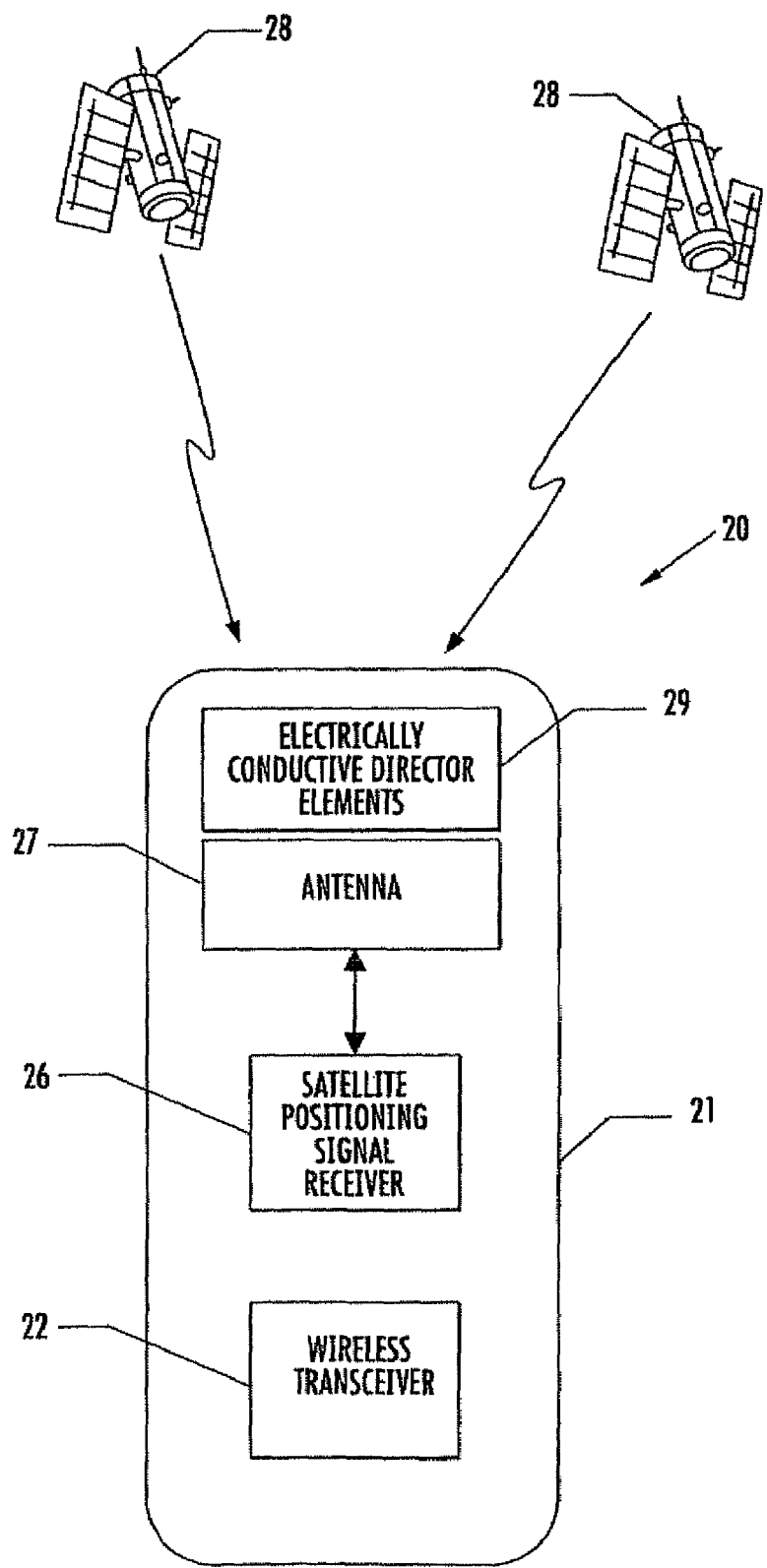
FIG. 1 is a schematic block diagram of a mobile wireless communications device in accordance with the present invention.

In view of the foregoing background, it is therefore an object of the present invention to provide a mobile wireless communications device including satellite positioning capabilities with enhanced satellite signal reception characteristics and related methods.

This and other objects, features, and advantages in accordance with the present invention are provided by a mobile wireless communications device which may include an antenna and at least one electrically conductive director therefor. More particularly, the mobile wireless communications may include a portable housing, and at least one wireless transceiver carried by the portable housing, and a satellite positioning signal receiver carried by the portable housing. The antenna may also be carried by the portable housing and connected to the satellite positioning signal receiver. Further, the at least one electrically conductive director element may be carried by the portable housing in spaced apart relation from the antenna and inductively coupled thereto for directing a beam pattern thereof. That is, the director element(s) advantageously directs or shapes the beam pattern of the antenna to provide desired satellite signal reception, and may further provide improved antenna efficiency.

The mobile wireless communications device may further include a printed circuit board (PCB) carried by the portable housing, and the antenna and the PCB may be relatively positioned so that the PCB further directs the beam pattern of the antenna. For example, the antenna may include one or more electrically conductive traces on the PCB, and the PCB may be positioned to provide a reflector for directing the antenna beam pattern skyward for improved satellite positioning signal reception performance. In one embodiment, the a dielectric extension may extend outwardly from the PCB, and the antenna may be carried by the dielectric extension. The electrically conductive director element(s) may also be carried by the dielectric extension.

The portable housing may have an upper portion and a lower portion, and the antenna may be positioned adjacent the upper portion of the portable housing. Moreover, the at least one wireless transceiver may be a cellular transceiver, and the device may further include a cellular antenna carried by the portable housing and connected to the cellular transceiver. By way of example, the cellular antenna may be carried adjacent the bottom portion of the portable housing.

The at least one electrically conductive director element may include a pair of parallel, spaced apart electrically conductive director elements, for example. The device may further include a controller carried by the portable housing and connected to the satellite positioning signal receiver, and a display carried by the portable housing and cooperating with the controller for displaying satellite positioning information. By way of example, the antenna may be an inverted F antenna or a monopole antenna.

A method aspect of the invention is for making a mobile wireless communications device, such as the one described briefly above. The method may include positioning a satellite positioning signal receiver and at least one wireless transceiver in a portable housing, and connecting an antenna carried by the portable housing to the satellite positioning signal receiver. Further, at least one electrically conductive director element may be positioned in spaced apart relation from the antenna to be inductively coupled thereto for directing a beam pattern thereof.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 2:
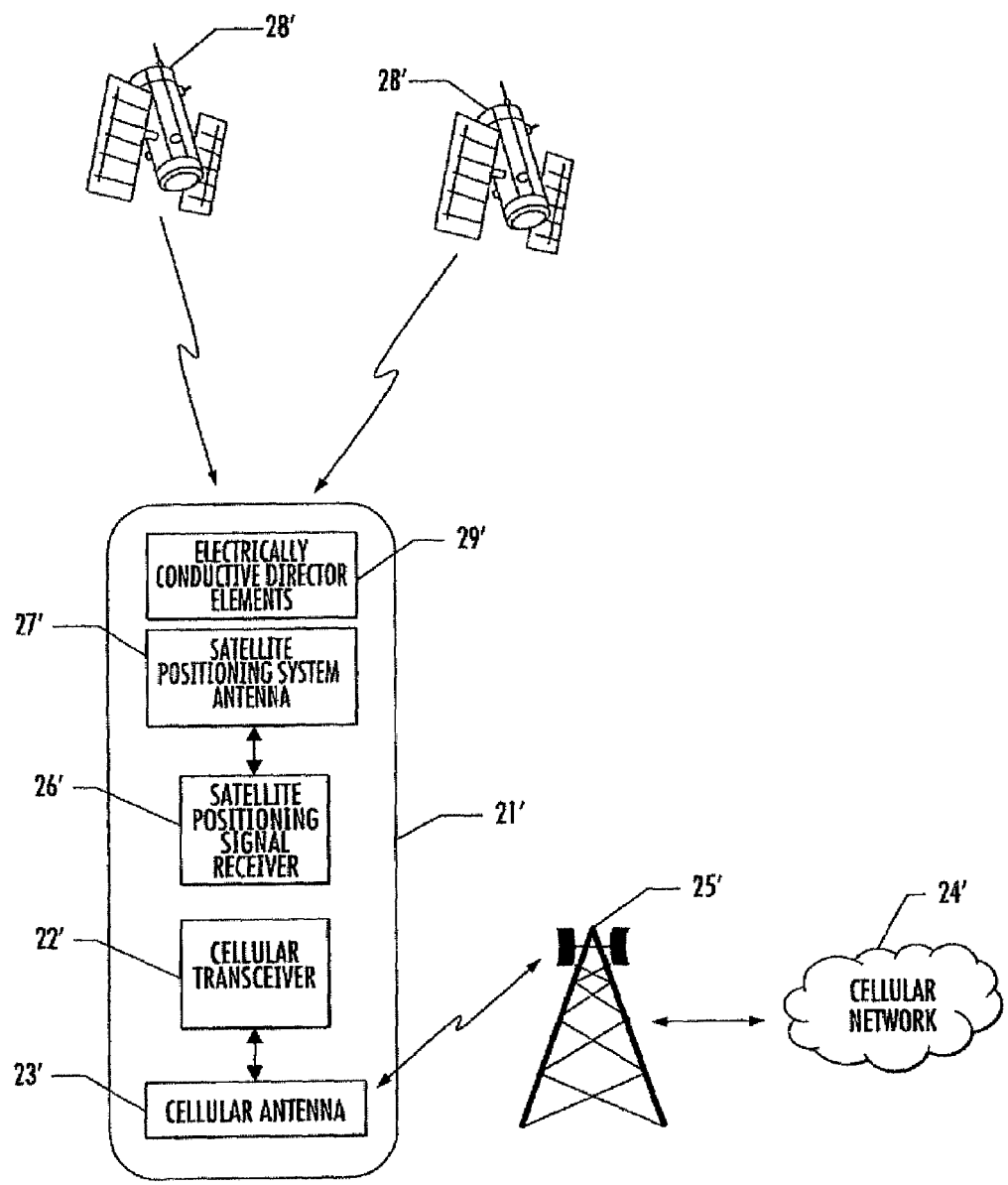
FIG. 2 is a schematic block diagram of an alternate embodiment of the mobile wireless communication device of FIG. 1.

Referring initially to FIGS. 1 and 2, a mobile wireless communications device 20 in accordance with the present invention illustratively includes a portable housing 21 and one or more wireless transceivers 22 carried by the portable housing. In the example illustrated in FIG. 2, a cellular transceiver 22' cooperates with a cellular antenna 23' to communicate over a cellular network 24' via a base station(s) 25', which is shown as a cell tower for clarity of illustration. In other embodiments, the wireless transceiver 22 be a wireless local or personal area network (LAN/PAN) transceiver for communicating via a wireless LAN/PAN, for example. In still further embodiments, both cellular and wireless LAN/PAN transceivers may be included, as will be appreciated by those skilled in the art.

The device 20 further illustratively includes a satellite positioning signal receiver 26 carried by the portable housing. By way of example, the satellite positioning signal receiver 26 may be a GPS receiver, although receivers compatible with other satellite positioning systems such as Galileo, for example, may also be used. An antenna 27 is also carried by the portable housing 21 and is connected to the satellite positioning signal receiver 26 for receiving positioning signals from GPS satellites 28, as will be appreciated by those skilled in the art. It should be noted that in some embodiments the antenna 27 may also be connected to the wireless transceiver(s) 22 and used for communicating over a wireless network(s) as well, as will be appreciated by those skilled in the art.

Further, the device 20 also illustratively includes one or more electrically conductive director elements 29 carried by the portable housing 21 in spaced apart relation from the satellite positioning system antenna 27 and inductively coupled thereto for directing a beam pattern thereof. That is, the director element(s) 29 advantageously directs or shapes the beam pattern of the antenna 27 skyward toward the GPS satellites 28 when the mobile wireless communications device 20 is held in an operating position, as will be discussed further below.

Figure 3:
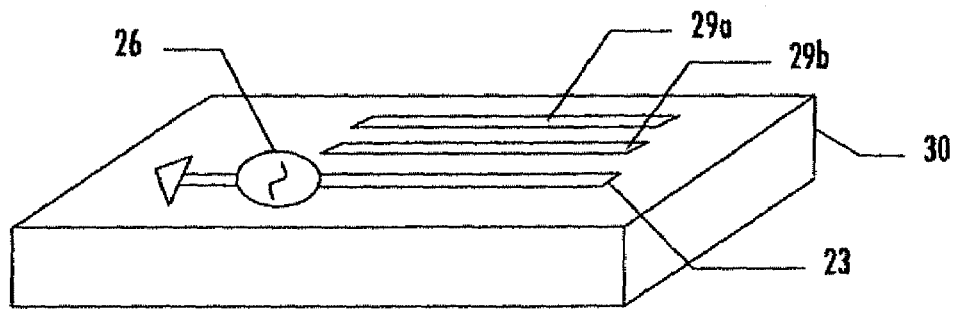
FIG. 3 is a schematic perspective view of a PCB and antenna arrangement for the wireless communications device of FIG. 1.
Figure 4:
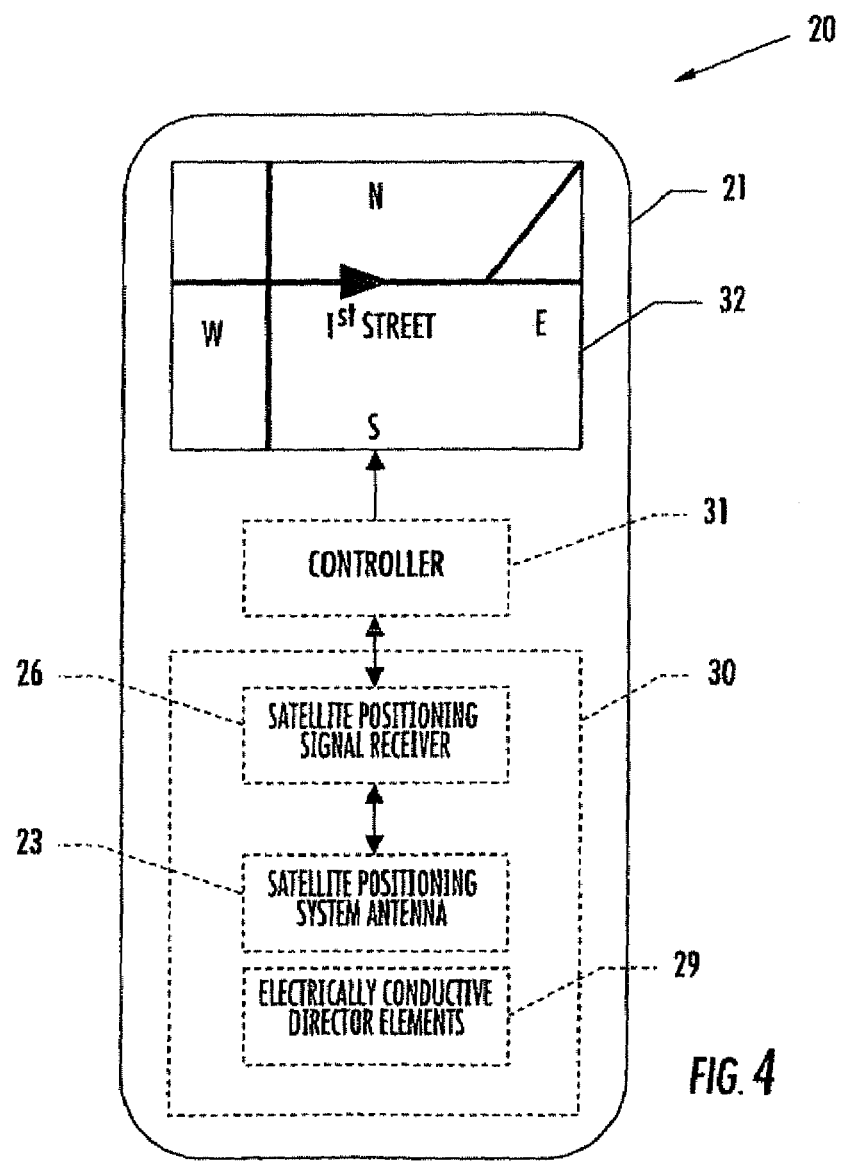
FIG. 4 is a schematic block diagram of the wireless communications device of FIG. 1 illustrating satellite positioning information display features thereof.

Turning now additionally to FIGS. 3 and 4, the mobile wireless communications device 20 may further include a printed circuit board (PCB) 30 carried by the portable housing 21. In the illustrated embodiment, the satellite positioning signal receiver 26 is illustratively shown as a signal source for clarity of illustration. The antenna 23 and the PCB 30 are relatively positioned so that the PCB further directs the beam pattern of the antenna. More particularly, in the illustrated embodiment the antenna 23 is a monopole antenna comprising a printed circuit element on an upper surface of the PCB 30. Furthermore, a pair of electrically conductive parallel spaced-apart traces provide directors 29a, 29b for the antenna 23.

The device 20 further illustratively includes a controller 31 carried by the portable housing 21 and connected to the satellite positioning signal receiver 26, and a display 32 carried by the portable housing and cooperating with the controller for displaying satellite positioning information. By way of example, the controller 31 may include a microprocessor and associated circuitry/memory, and the display 32 may be a liquid crystal display (LCD), although other suitable components or displays may also be used. While not shown in FIG. 4, the controller 31 may be carried by the PCB 30, as will be appreciated by those skilled in the art. It should be noted that those components which are within the portable housing and not externally viewable are shown with dashed lines for clarity of illustration in FIG. 4.

When using the GPS function of the device 20 a user may hold the device in an operating position in which the display 32 is viewable to the user. In the exemplary embodiment, the controller 31 executes a mapping program which translates the positioning data received from the satellite positioning signal receiver 26 into location coordinates which are displayed at a corresponding location on a map, as will be readily appreciated by those skilled in the art. Thus, when the user holds the device 20 so that the display 32 faces him in an operating position, the PCB 30 serves as a reflector for directing the antenna beam pattern skyward for improved satellite positioning signal reception performance. The director elements 29a, 29b not only help direct/shape the beam pattern in the desired direction, they may also provide improved antenna efficiency.

Figure 7:
FIG. 7 is a schematic diagram of a prior art monopole antenna.
Figure 8:
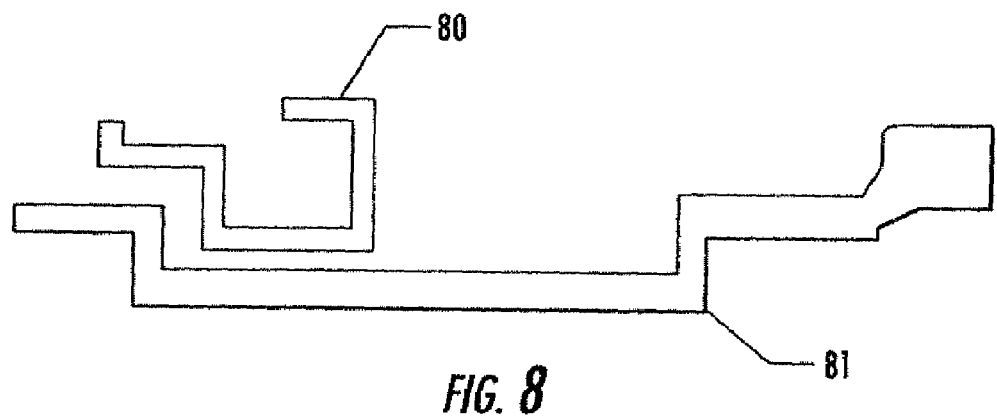
FIG. 8 is a schematic diagram of a monopole antenna and associated electrically conductive director element in accordance with the present invention used for a performance test comparison with respect to the prior art antenna of FIG. 7.

By way of example, the performance of a first monopole antenna 70 (FIG. 7) without a director element was compared with that of a second monopole antenna 80 having an electrically conductive director element 81 inductively coupled thereto, as shown in FIG. 8. Both of the first and second antennas 70, 80 were mounted adjacent the top end of a mobile phone circuit board for testing, similar to the configuration illustrated in FIG. 5. The first antenna 70 was designed to provide peak gain over the frequencies of interest. However, as will be appreciated by those skilled in the art, inductively coupling the director element 81 to the first antenna 70 would change the characteristics of the antenna such that it would no longer provide peak gain over the same frequencies. Thus, to provide a meaningful comparison, the second antenna 80 was designed such that when the director element 81 was coupled thereto, its peak gain would also occur over the same frequencies as the first antenna 70 without a director element. With the director element 81 inductively coupled to the second antenna 80, the second antenna provided better than a 1 dB improvement in average gain with respect to the first antenna 70 at three different test frequencies, as summarized in Table 1, below.

TABLE 1

|  | 1565.42 MHZ | 1575.42 MHZ | 1585.42 MHZ |
| --- | --- | --- | --- |
| Gain of First Antenna 70 With No Director Element | −4.06188 dB | −4.20504 dB | −4.51069 dB |
| Gain of Second Antenna 80 With Director Element 81 | −2.96706 dB | −2.94389 dB | −3.13042 dB |

Figure 5:
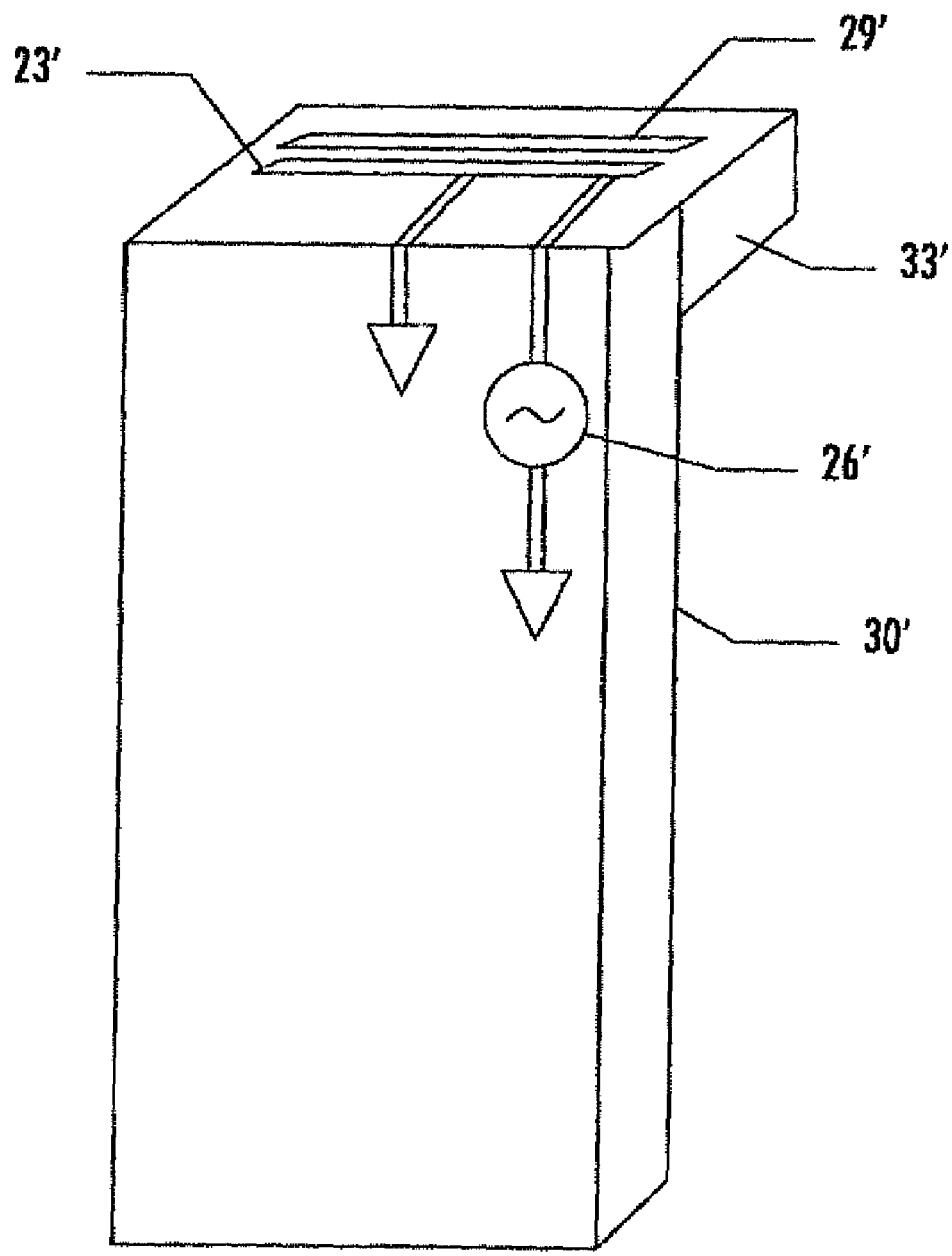
FIG. 5 is a schematic perspective view of an alternate embodiment of a PCB and antenna arrangement for the wireless communications device of FIG. 1.

In accordance with an alternate embodiment now described with reference to FIG. 5, a dielectric extension 33' illustratively extends outwardly from the PCB 30', and the antenna 23' and electrically conductive director element 29' are carried on an upper surface of the dielectric extension. In the exemplary embodiment, the antenna 23' is a printed inverted F antenna, although other antenna configurations than those shown herein may also be used. The director element 29' may also be a printed conductive trace or traces on the dielectric extension 33'.

The dielectric extension 33' and antenna 23' may advantageously be positioned adjacent an upper portion or top of the portable housing 21' using this configuration. This configuration also advantageously directs or shapes the beam pattern skyward when a user holds the device 20 so that he can see the display 32, as will be appreciated by those skilled in the art. Moreover, this allows the cellular (or other wireless) antenna 23 to be carried adjacent the bottom portion of the portable housing 21, as schematically illustrated in FIG. 2. This not only provides for reduced interference between the two antennas, but it may also help with specific absorption ratio (SAR) compliance by moving the cellular antenna 23 further away from a user's brain when he places the input audio transducer of the device 20 (not shown) adjacent his ear, as will also be appreciated by those skilled in the art.

A method aspect of the invention is for making the mobile wireless communications device 20 and may include positioning a satellite positioning signal receiver 26 and at least one wireless transceiver 22 in a portable housing 21, and connecting an antenna 27 carried by the portable housing to the satellite positioning signal receiver. Further, at least one electrically conductive director element 29 is positioned in spaced apart relation from the antenna 27 and inductively coupled thereto for directing a beam pattern thereof, as discussed further above.

Figure 6:
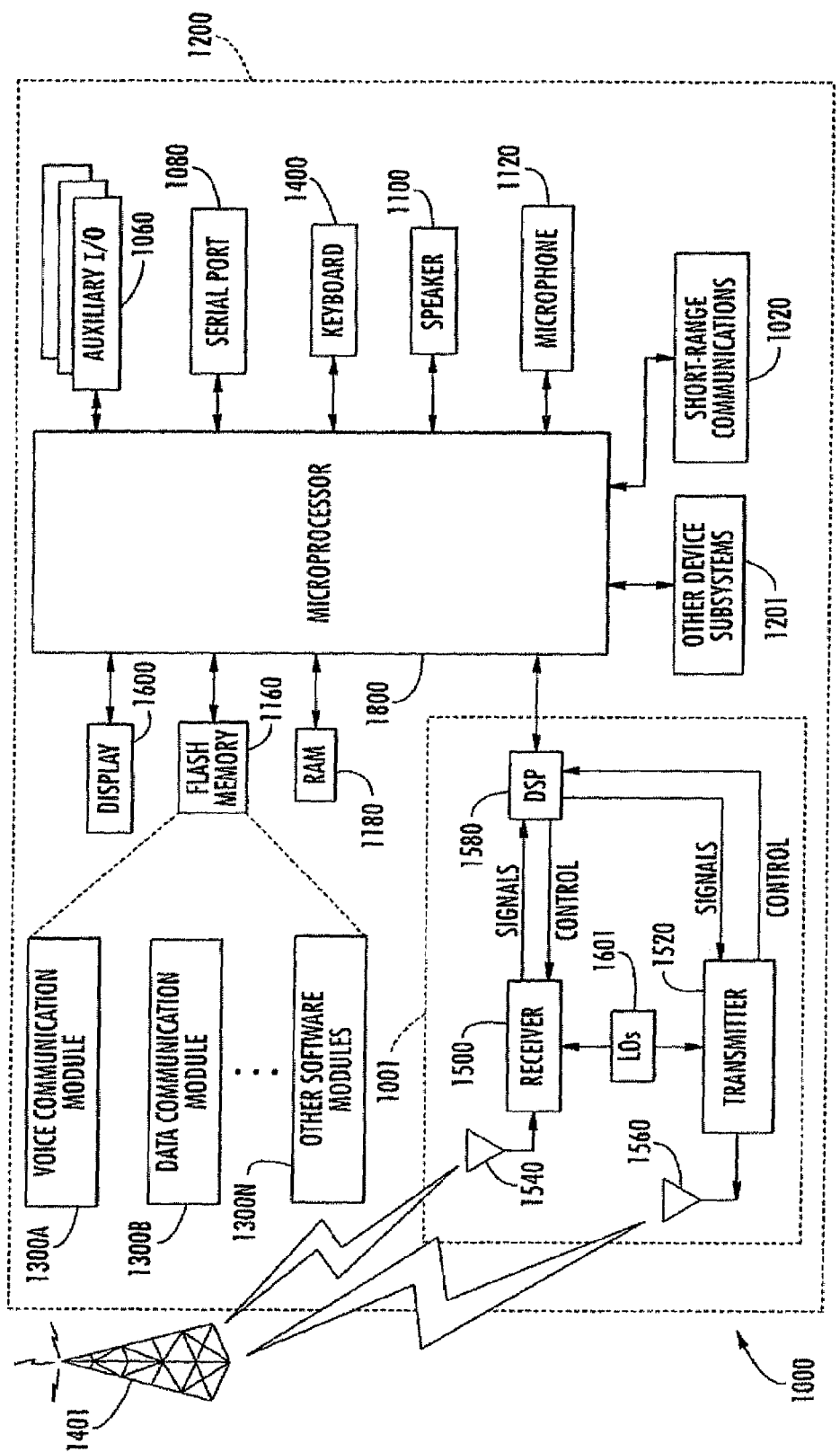
FIG. 6 is a schematic block diagram of an exemplary mobile wireless communications device arrangement for use with the present invention.

Additional features and components of a mobile wireless communication device in accordance with the present invention will be further understood with reference to FIG. 6. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 are shown schematically in FIG. 6. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared and associated circuits and components, or a BLUEtooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
a portable housing;
at least one wireless transceiver carried by said portable housing;
a satellite positioning signal receiver carried by said portable housing;
an antenna carried by said portable housing and connected to said satellite positioning signal receiver;
at least one electrically conductive director element carried by said portable housing in spaced apart relation from said antenna and inductively coupled thereto for directing a beam pattern thereof; and
a printed circuit board (PCB) carried by said portable housing and a dielectric extension extending outwardly from said PCB, said dielectric extension carrying said antenna.

2. The mobile wireless communications device of claim 1 wherein said at least one electrically conductive director element is also carried by said dielectric extension.

3. The mobile wireless communications device of claim 1 wherein said portable housing has an upper portion and a lower portion, and wherein said antenna is positioned adjacent the upper portion of said portable housing.

4. The mobile wireless communications device of claim 1, wherein said at least one wireless transceiver comprises a cellular transceiver, and further comprising a cellular antenna carried by said portable housing and connected to said cellular transceiver.

5. The mobile wireless communications device of claim 1 wherein said at least one electrically conductive director element comprises a pair of parallel, spaced apart electrically conductive director elements.

6. The mobile wireless communications device of claim 1 further comprising a controller carried by said portable housing and connected to said satellite positioning signal receiver, and a display carried by said portable housing and cooperating with said controller for displaying satellite positioning information.

7. The mobile wireless communications device of claim 1 wherein said antenna comprises an inverted F antenna.

8. The mobile wireless communications device of claim 1 wherein said antenna comprises a monopole antenna.

9. A mobile wireless communications device comprising:
a portable housing having an upper portion and a lower portion;
a cellular transceiver carried by said portable housing;
a cellular antenna carried by said portable housing adjacent the lower portion thereof and connected to said cellular transceiver;

a satellite positioning signal receiver carried by said portable housing;

a satellite positioning system antenna carried by said portable housing adjacent the upper portion thereof and connected to said satellite positioning signal receiver;

at least one electrically conductive director element carried by said portable housing in spaced apart relation from said satellite positioning system antenna and inductively coupled thereto for directing a beam pattern thereof; and a printed circuit board (PCB) carried by said portable housing and a dielectric extension extending outwardly from said PCB adjacent the upper portion of said housing, said dielectric extension carrying said satellite positioning system antenna.

10. The mobile wireless communications device of claim 9 wherein said at least one electrically conductive director element is also carried by said dielectric extension.

11. The mobile wireless communications device of claim 9 further comprising a controller carried by said portable housing and connected to said satellite positioning signal receiver, and a display carried by said portable housing and cooperating with said controller for displaying satellite positioning information.

12. A method for making a mobile wireless communications device comprising:

positioning a satellite positioning signal receiver and at least one wireless transceiver in a portable housing;

connecting an antenna carried by the portable housing to the satellite positioning signal receiver;

positioning at least one electrically conductive director element in spaced apart relation from the antenna to be inductively coupled thereto for directing a beam pattern thereof; and positioning in the housing a printed circuit board (PCB) with a dielectric extension extending outwardly therefrom and carrying the antenna.

13. The method of claim 12 wherein positioning the at least one electrically conductive director element comprises positioning the at least one electrically conductive director element on the dielectric extension.

14. The method of claim 12 wherein the portable housing has an upper portion and a lower portion, and further comprising positioning the antenna adjacent the upper portion of the portable housing.

15. The method of claim 12 wherein the at least one wireless transceiver comprises a cellular transceiver, and further comprising positioning a cellular antenna in the portable housing and connecting the cellular antenna to the cellular transceiver.

16. The method of claim 12 further comprising positioning a controller in the portable housing and connecting the controller to the satellite positioning signal receiver, and a positioning a display in the portable housing for cooperating with the controller for displaying satellite positioning information.

* * * * *